(12) United States Patent
Meyer et al.

(10) Patent No.: US 6,430,639 B1
(45) Date of Patent: Aug. 6, 2002

(54) MINIMIZING USE OF BUS COMMAND CODE POINTS TO REQUEST THE START AND END OF A LOCK

(75) Inventors: Derrick R. Meyer; William K. Lewchuk, both of Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/339,351

(22) Filed: Jun. 23, 1999

(51) Int. Cl.⁷ .............................................. G06F 12/00
(52) U.S. Cl. ...................... 710/200; 710/108; 711/146
(58) Field of Search ................................. 710/200, 240, 710/244, 242, 111, 108, 113, 119; 711/146, 151

(56) References Cited

U.S. PATENT DOCUMENTS

| | | | | |
|---|---|---|---|---|
| 5,016,167 A | * | 5/1991 | Nguyen et al. | 711/151 |
| 5,133,074 A | * | 7/1992 | Chou | 711/146 |
| 5,175,837 A | | 12/1992 | Arnold et al. | |
| 5,263,146 A | | 11/1993 | Mishima | |
| 5,586,253 A | | 12/1996 | Green et al. | |
| 5,615,373 A | * | 3/1997 | Ho | 710/200 |
| 5,615,403 A | | 3/1997 | Bissett et al. | |
| 5,706,446 A | * | 1/1998 | Kalish et al. | 710/113 |

FOREIGN PATENT DOCUMENTS

WO 99/19801 4/1999

OTHER PUBLICATIONS

International Search Report, Application No. PCT/US 00/00605, mailed: Jul. 21, 2000.
Intel®, *i960® Processors and Related Products*, "High–Performance 32–Bit RISC Processors for Embedded Application," 1995, pp. 1–339 through 1–341.
Intel®, *Microprocessors vol. I*, 1993, pp. 2–455 through 2–461.
Intel®, *Pentium™ Processor User's Manual vol. 3: Architecture and Programming Manual*, 1993, pp. 25–9 through 25–18 and p. 25–195.
Intel®, *Pentium® Pro Family Developer's Manual vol. 3: Operating System Writer's Guide*, 1996, pp. 7–1 through 7–8 and pp. 15–10 and 15–22.
*Digital 21164 PICMG SBC Technical Reference Information*, Digital Equipment Corporation, Sep. 1997.
*AMD–K6 MMX Processor, Data Sheet*, Advanced Micro Devices, Inc., 1997, pp. 6–32 through 6–35.

* cited by examiner

*Primary Examiner*—Sumati Lefkowitz
*Assistant Examiner*—X. Chung-Trans
(74) *Attorney, Agent, or Firm*—Conley, Rose & Tayon, PC; Lawerence J. Merkel

(57) ABSTRACT

A system and method for using a toggle command for setting and releasing a lock, i.e. a locktoggle. In an exemplary computer system, one or more processors are each coupled to a bus bridge through separate high speed connections, such as a pair of uni-directional address buses with respective source-synchronous clock lines and a bi-directional data bus with attendant source-synchronous clock lines. The locktoggle command is used to transmit both a lock request and an unlock request from a processor to a system coherency. point, e.g. the bus bridge. The system coherency point acknowledges when the lock has been established or released. While the lock is active, other processors are inhibited. from accessing at least the memory locations for which the lock was initiated. Locks are thus established at the system coherency point, which may advantageously allow for locking functionality in a non-shared bus system. The use of the locktoggle command may advantageously allow for the use of a single command code point, leaving other points available for other uses.

36 Claims, 6 Drawing Sheets

FIG. 6

SADDOUT[14:2]#

| BIT-TIME | 14 | 13 | 12 | 11 | 10 | 9 | 8 | 7 | 6 | 5 | 4 | 3 | 2 |
|---|---|---|---|---|---|---|---|---|---|---|---|---|---|
| 0 | M1 | COMMAND[4:0] | | | | | ADDRESS | | | | | | |
| 1 | ADDRESS | | | | | | | | | | | | |
| 2 | M2 | MASK[7:0] | | | | | | | | CH | | ID[2:0] | |
| 3 | RV | ADDRESS | | | | | | | | | | | |

FIG. 7

SADDIN[14:2]#

| BIT-TIME | 14 | 13 | 12 | 11 | 10 | 9 | 8 | 7 | 6 | 5 | 4 | 3 | 2 |
|---|---|---|---|---|---|---|---|---|---|---|---|---|---|
| 0 | 1 | PROBE[4:0] | | | | | ADDRESS | | | | | | |
| 1 | ADDRESS | | | | | | | | | | | | |
| 2 | 0 | SYSDC[4:0] | | | | | RVB | RPB | A | ID[3:0] | | | |
| 3 | C | ADDRESS | | | | | | | | | | | |

MINIMIZING USE OF BUS COMMAND CODE POINTS TO REQUEST THE START AND END OF A LOCK

BACKGROUND OF THE INVENTION

1. Field of the Invention

This invention relates to communications interfaces, and more particularly to a locktoggle command to request either the start or the end of a lock condition.

2. Description of the Related Art

In computer systems, especially computer systems including multiple processors that may access memory or I/O (input/output) spaces concurrently, some mechanism is needed to assure that atomic accesses to memory are not interrupted by another system device. For example, a first system device may want to read a location in memory and then write a new value to that same memory location, as in the case of a memory-based variable. Some mechanism is needed to "lock" the system so that a second system device cannot also read and/or write the same memory location before the first system device has finished with the memory location operations. In general, a locked operation may be defined as a sequence of one or more read cycles followed by one or more write cycles from a given device to a given memory location or range. No other device has access to at least the given memory location during the sequence comprising the locked operation.

In x86 processors, the locking functionality is provided for certain instructions that use a LOCK prefix. Certain other instructions implicitly specify that memory reads and writes be locked. It is noted that locked operations may also include page table updates and interrupt acknowledge cycles, as well. In the x86 hardware, locking has traditionally been implemented through a LOCK# pin on the x86 processor. A processor performing a lock. operation asserts the LOCK# pin during the sequence of reads and writes comprising the locked operation. Since x86 processors have generally been designed into computer systems in which processor access to memory is provided through a single shared processor bus, the LOCK# pin assertion may be used to dedicate the shared bus resource to the locking processor. As other processors sharing the bus resource are inhibited from accessing the shared bus while the shared bus is locked, other processors cannot interrupt the atomic sequence of reads and writes.

Unfortunately, shared bus systems suffer from several drawbacks. For example, since there are multiple devices attached to the shared bus, the bus is typically operated at a relatively low frequency. The multiple attachments present a high capacitive load to a device driving a signal on the bus, and the multiple attach points present a relatively complicated transmission line model for high frequencies. Accordingly, the frequency remains low, and bandwidth available on the shared bus is similarly relatively low. The low bandwidth presents a barrier to attaching additional devices to the shared bus, as performance may be limited by available bandwidth.

Another disadvantage of the shared bus system is a lack of scalability to larger numbers of devices. As mentioned above, the amount of bandwidth is fixed (and may decrease if adding additional devices reduces the operable frequency of the bus). Once the bandwidth requirements of the devices attached to the bus (either directly or indirectly) exceeds the available bandwidth of the bus, devices will frequently be stalled when attempting access to the bus. Overall performance of the computer system may thus be decreased.

Since x86 processors have continued to increase in operating frequency and overall performance, the shared computer bus computer system model is becoming a performance limitation. A method for providing lock functionality in a non-shared bus system is therefore desired.

SUMMARY OF THE INVENTION

The problems outlined above are in large part solved by a system and method for using a toggle command for setting and releasing a lock, i.e. a locktoggle. In an exemplary computer system, one or more processors are each coupled to a bus bridge through separate high speed connections, which in one embodiment each include a pair of unidirectional address buses with respective source-synchronous clock lines and a bi-directional data bus with attendant source-synchronous clock lines. The locktoggle command is used to transmit both a lock request and an unlock request from a processor to a system coherency point, e.g. the bus bridge. The system coherency point acknowledges when the lock has been established or released. While the lock is active, other processors are inhibited from accessing at least the memory locations for which the lock was initiated. Locks are thus established at the system coherency point, which may advantageously allow for locking functionality in a non-shared bus system. The use of the locktoggle command may also advantageously allow for the use of a single command code point, leaving other points available for other uses.

Broadly speaking, a processor is contemplated, comprising a decode unit, a load/store unit, and a system interface controller. The decode unit is coupled to receive and decode a first one or more instructions that specify a lock. The decode unit is configured to generate a lock indication in response to the first one or more instructions. The load/store unit is coupled to receive the lock indication and the first one or more instructions from the decode unit. The load/store unit is configured to select the first one or more instructions for execution and to transmit a first request for a locktoggle command in response thereto. The system interface controller is coupled between the load/store unit and a bus. The system interface controller is configured to receive the first request for the locktoggle command from the load/store unit and to issue the first locktoggle command in response to receiving the request for the first locktoggle command. The load/store unit is further configured to transmit a second request for the locktoggle command in response to executing the first one or more instructions. The system interface controller is further configured to receive the second request for the locktoggle command from the load/store unit and to issue the second locktoggle command in response to receiving the second request for the locktoggle command.

A bridge for coupling one or more processors into a computer system is also contemplated. Broadly speaking, the bridge comprises a first input port coupled to receive a plurality of commands from a first one of the one or more processors, a first processor queue coupled to the first. input port, a lock register configured to store a lock condition, and control logic coupled to the first input queue and the lock register. The first input port is configured to transfer the plurality of commands from the first one of said one or more processors to the first processor queue. The first processor queue is configured to store the plurality of commands from the first one of the one or more processors. The plurality of commands from the first one of the one or more processors includes a locktoggle command. The control logic is configured to remove the plurality of commands from the first one of the one or more processors from the first processor queue. In response to removing the locktoggle command from the first processor queue, the control logic is configured to check the lock condition. The control logic is further configured to set the lock condition to indicate a lock for the first one of the one or more processors if the lock condition indicates a lack of lock. The control logic is further configured to set the lock condition to indicate the lack of lock if the lock condition indicates the lock.

A computer system is also contemplated. Broadly speaking, the computer system comprises one or more processors and a bridge coupled to the one or more processors. The bridge is configured to execute commands received from the one or more processors. Each of the one or more processors is configured to transmit a locktoggle command to the bridge to request that a lock condition be set to indicate a lock. The bridge is configured in response to receiving the locktoggle command from a first one of the one or more processors to check the lock condition. The control logic is further configured to set the lock condition to indicate the lock for the first one of the one or more processors if the lock condition indicates a lack of lock and to set the lock condition to indicate the lack of lock if the lock condition indicates the lock.

A method for operating a computer system including one or more processors and a system device is also contemplated. Broadly speaking, the method comprises issuing a first locktoggle command from a first processor of the one or more processors to the system device. The method further checks an indication of a lock condition in the system device in response to the first locktoggle command. The method further comprises setting the lock condition to indicate a lock by the first processor in response to checking the indication of the lock condition and determining that the lock condition indicates a lack of lock. The method also sets the lock condition to indicate the lack of lock in response to checking the indication of the lock condition and determining that the lock condition indicates lock.

BRIEF DESCRIPTION OF THE DRAWINGS

Other objects and advantages of the invention will become apparent upon reading the following detailed description and upon reference to the accompanying drawings in which:

FIG. 6 is a diagram of an embodiment of a format for processor-initiated commands in the computer system of FIG. 1; and FIG. 7 is a diagram of an embodiment of a format for commands used by the bridge to maintain memory coherency and to move data in the computer system of FIG. 1.

Figure 1:
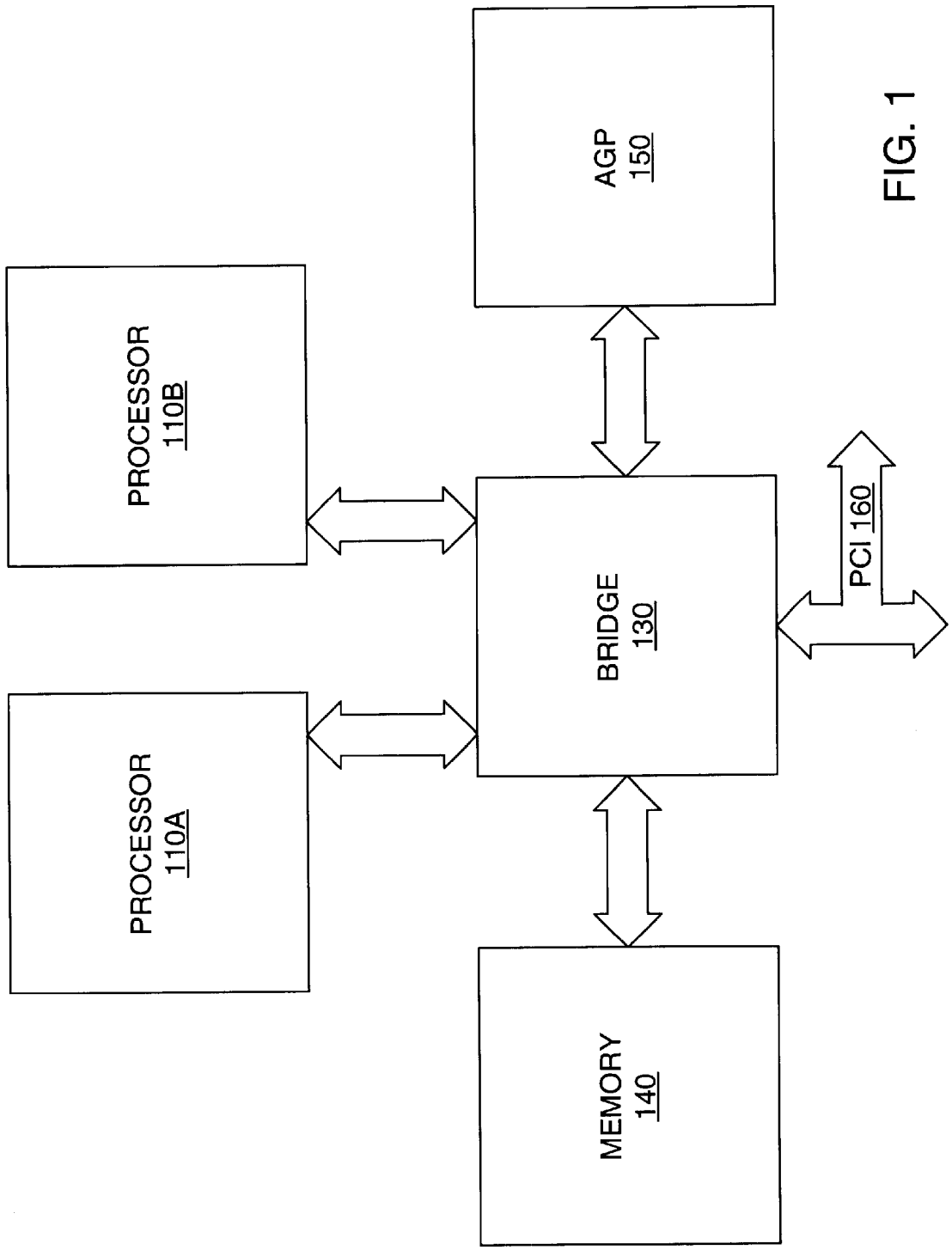
FIG. 1 is a block diagram of an embodiment of a computer system including two processors with separate buses coupling the processors to the bridge.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning to FIG. 1, a block diagram of an embodiment of a generalized computer system is illustrated. A first processor 110A and a second processor 110B each couple to a bridge 130 through separate processor buses. Both the first processor 110A and the second processor 110B are preferably configured to perform memory and I/O operations using their respective processor buses. In one embodiment, processors 110A and 110B implement the x86 instruction set architecture. Other embodiments may implement any suitable instruction set architecture. The bridge 130 is further coupled to a memory 140. The memory 140 is preferably configured to store data and instructions accessible to both the first processor 110A and the second processor 110B, as well as other system devices. The memory 140 may be comprised of SDRAM (Synchronous Dynamic Random Access Memory), RDRAM (Rambus DRAM) [RDRAM. and RAMBUS are registered trademarks of Rambus, Inc.], or any other suitable memory type. An advanced graphics port device (AGP) 150 is also optionally coupled to the bridge 130. As shown, a Peripheral Component Interconnect (PCI) bus 160 is also coupled to the bridge 130. A variety of I/O components may be coupled to the PCI bus 160.

It is noted that in embodiments of the computer system including a legacy bus, such as an Industry Standard Architecture (ISA) bus, the bridge 130 is often referred to an a northbridge 130, with the bridge (not shown) between the PCI bus 160 and the legacy bus referred to as a southbridge. It is also noted that in the illustrated embodiment, the bridge 130 is the system master for the computer system. While the illustrated embodiment includes two processors 110A and 110B, it is noted any number of processors 110 may be included in the computer system as desired.

In the illustrated embodiment, as the system master, the bridge 130 operates to coordinate communications between processors 110A and 110B, the memory 140, the AGP device 150, and the PCI bus, etc. The bridge 130 maintains coherency for data transfers among the devices of the computer system by probing processor 110A and/or processor 110B for memory locations accessed by the other processor 110A or 110B, the AGP device 150, or a PCI device on the PCI bus 160, etc.

Figure 2:
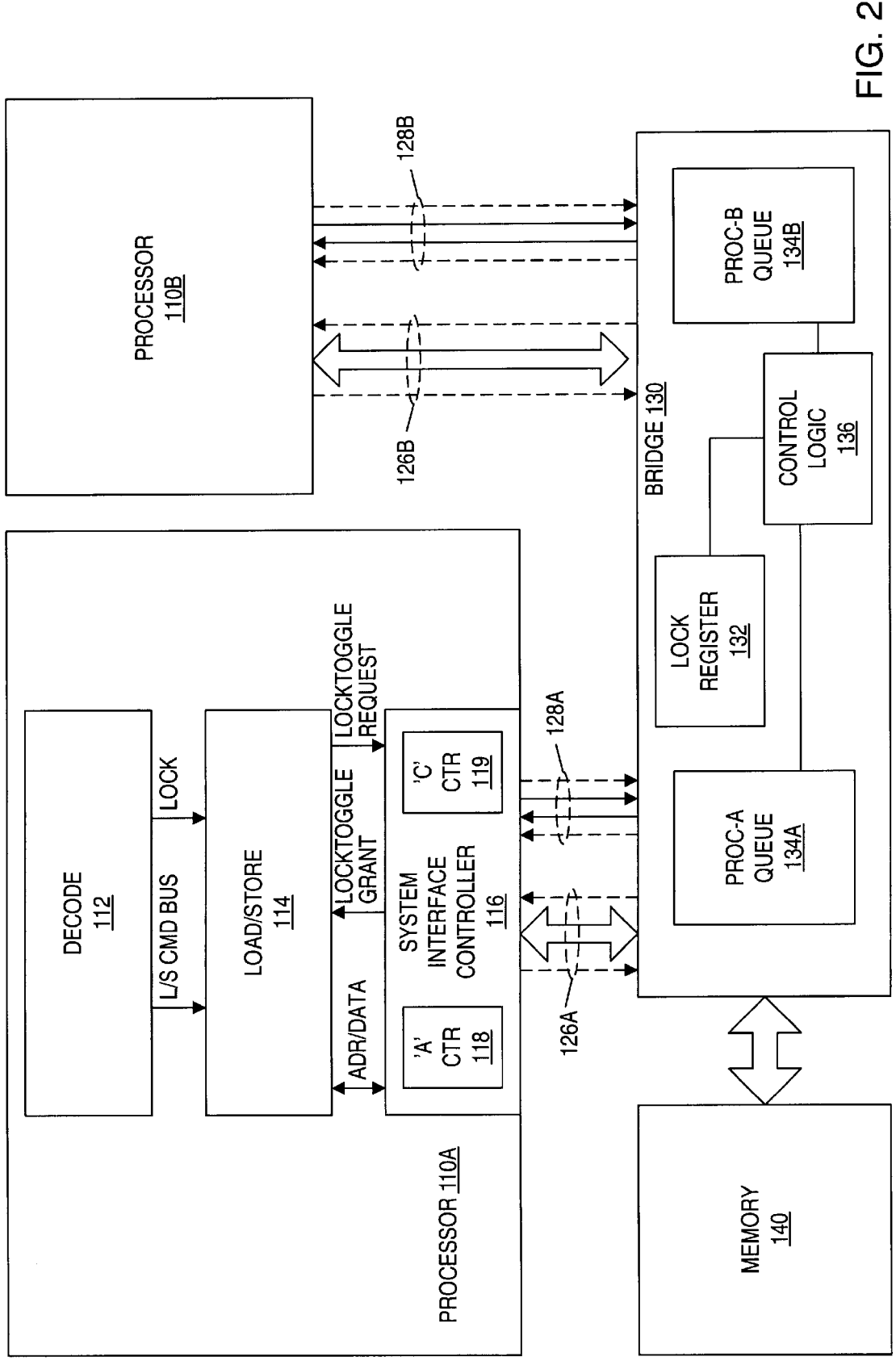
FIG. 2 is a block diagram of an embodiment of the processors and the bridge of FIG. 1. configured to process one or more locked transactions.

Turning now to FIG. 2, a more detailed block diagram of an embodiment of certain components of the generalized computer system of FIG. 1 is illustrated. Various details of the first processor 110A, the processor bus components 126A and 128A, as well as the bridge 130 are illustrated.

As shown, processor 110A includes a decode unit 112 coupled to a load/store unit 114 through a L/S command bus and a lock signal line. The load/store unit 114 is coupled to a system interface controller 116 through an address and data bus, as well as a locktoggle request signal line and a locktoggle grant signal line. The system interface controller 116 includes a resource counter 118 (A-counter) and a commit counter 119 (C-counter). The first processor 110A and the second processor 110B each couple to bridge 130 through separate processor buses. Each processor bus.

includes a bi-directional data bus with dedicated source-synchronous clock lines 126. and unidirectional address in and address out lines (an address bus) each with an associated source-synchronous clock line 128. The processor bus between the first processor 110A and the bridge 130 includes data bus 126A and address bus 128A, coupling to the bridge 130 through at least a first input port. The processor bus between the second processor 110B and the bridge 130 includes data bus 126B and address bus 128B, coupling to the bridge through at least a second input port. The bridge 130 includes a first processor queue 134A dedicated to store commands from the first processor 110A and a second processor queue 134B dedicated to store commands from the second processor 110B. Memory 140 is also shown coupled to the bridge 130.

In general, when a lock is not indicated, the operation of the computer system is as follows: The decode unit 112 of processor 110A receives and decodes instructions. The decode unit 112 conveys memory operations (instructions that specify loads or stores to memory) to the load/store unit 114. The load/store unit 114 may convey memory operations to an internal data cache (not shown) and the memory operations requiring system service to the system interface controller 116. The system interface controller 116 conveys operations to a system device such as bridge 130 using address buses 128A and data bus 126A. More particularly, the system interface controller 116 transmits the address and command information on the address out portion of the address buses 128A. Bridge 130 signals readiness, on the address in portion of the address buses 128A, for the corresponding data transfer. The corresponding data are then transmitted on the data bus 126A.

For most commands sent to the bridge 130, the system interface controller 116 increments a resource counter 118 (A-counter) and a commit counter 119 (C-counter). Control logic 136 in the bridge 130 receives commands from the first processor 110A and the second processor 110B and places the commands in respective queues, processor A queue 134A and processor B queue 134B. The control logic 136 removes commands from the processor A queue 134A and processor B queue 134B in an order proscribed by a predetermined protocol, such as by following a round robin or last accessed algorithm. Processor 110B operates in a similar fashion. It is noted that certain commands may not be tracked by the resource counter 118 and/or the commit counter 119. Example commands not tracked may include certain probe responses, certain buffer flushes, no operation commands (NOPs), and special block memory commands.

In response to freeing up a queue entry, such as by removing a command from the processor A queue 134A, the control logic 136 sends an acknowledge signal to the system interface controller 116 of the respective processor 110A. The system interface controller 116 decrements the resource counter 118 in response to receiving the acknowledge signal from the bridge 130. Once the bridge 130, acting as the system master, reaches a coherency point with respect to a particular processor command, the control logic 136 sends a commit signal to the appropriate system interface controller 116. The system interface controller 116 is configured to decrement the commit counter 119 in response to receiving the commit signal from the bridge 130. It is noted that in a preferred embodiment, the processor 110 does not associate a commit signal with any particular processor command. The bridge 130 simply returns the commit signal when any one processor command has reached the coherency point. The acknowledge and commit signals may be part of an address-in command on the address-in portion of the address bus 128A.

In one embodiment, the processors 110A and 110B are configured to stop sending new commands to the bridge 130 when the value in the resource counter 118 and/or the commit counter 119 reaches a predetermined value. The resource counter 118 may allow each processor 110 to track how many commands have been sent to the bridge 130 that have not been acknowledged by the bridge 130. The commit counter 119 may allow each processor 110 to limit the number of outstanding commands sent to the bridge 130 that have not yet reached the coherency point.

It is noted that in various embodiments, the use and interpretation of the resource counter 118 may differ. In one embodiment, a four-entry common processor queue 134 feeds two larger queues, one for reads and one for writes. The acknowledge limit (the limit to the number of processor 110 issued commands that have not yet been acknowledged) is set to four. In another embodiment, one processor queue 134 holds both reads and writes. The A-bit is returned from the bridge 130 to the processor 110 when the common queue entry is deallocated.

Broadly speaking, when a first processor 110A of one or more processors 110 desire to perform atomic accesses to memory 140, or any other one or more operations that require a lock, the first processor 110A sends a first locktoggle command to the system master, such as bridge 130. The first processor 110A typically refrains from sending any more commands to the bridge 130 until the first locktoggle command has been committed and the lock is indicated, although certain commands may be sent after the locktoggle command under certain circumstances. The bridge 130 operates to select commands from the one or more processor queues 134 until the first locktoggle command is reached. In executing the first locktoggle command, the bridge 130 examines the lock condition in lock register 132, initiates the lock for the first processor 110A, and notifies the first processor 110A upon committing the locktoggle command. The bridge 130 ignores commands from all other processors 110 while the lock condition indicates a lock for the first processor 110A. The first processor 110A transmits the one or more instructions that specified the lock to the bridge 130 for execution. The first processor 110A subsequently also transmits a second locktoggle command to the bridge 130 to set the lock condition to unlock. After completing the instructions that specified the lock and executing the second locktoggle command, the bridge 130 notifies the first processor 110A that the lock condition has been set to unlock again. The bridge 130 then returns to selecting commands from all of the one or more processor queues 134 according to a predetermined protocol.

In the illustrated system, a source-synchronous clock is transmitted in the same direction as associated data. The source-synchronous clock and its associated data are received together. It is noted that "a source-synchronous clock" is also referred to as "a forwarded clock". It is also noted that although source-synchronous clocking is shown in the illustrative embodiment, any clocking mechanism appropriate to the computer system may be used. The data bus 126A and the address buses 128A are also exemplary only. Various details regarding operations of the computer system shown in FIG. 2 are provided with respect to the descriptions of FIGS. 3–5 below.

Figure 3:
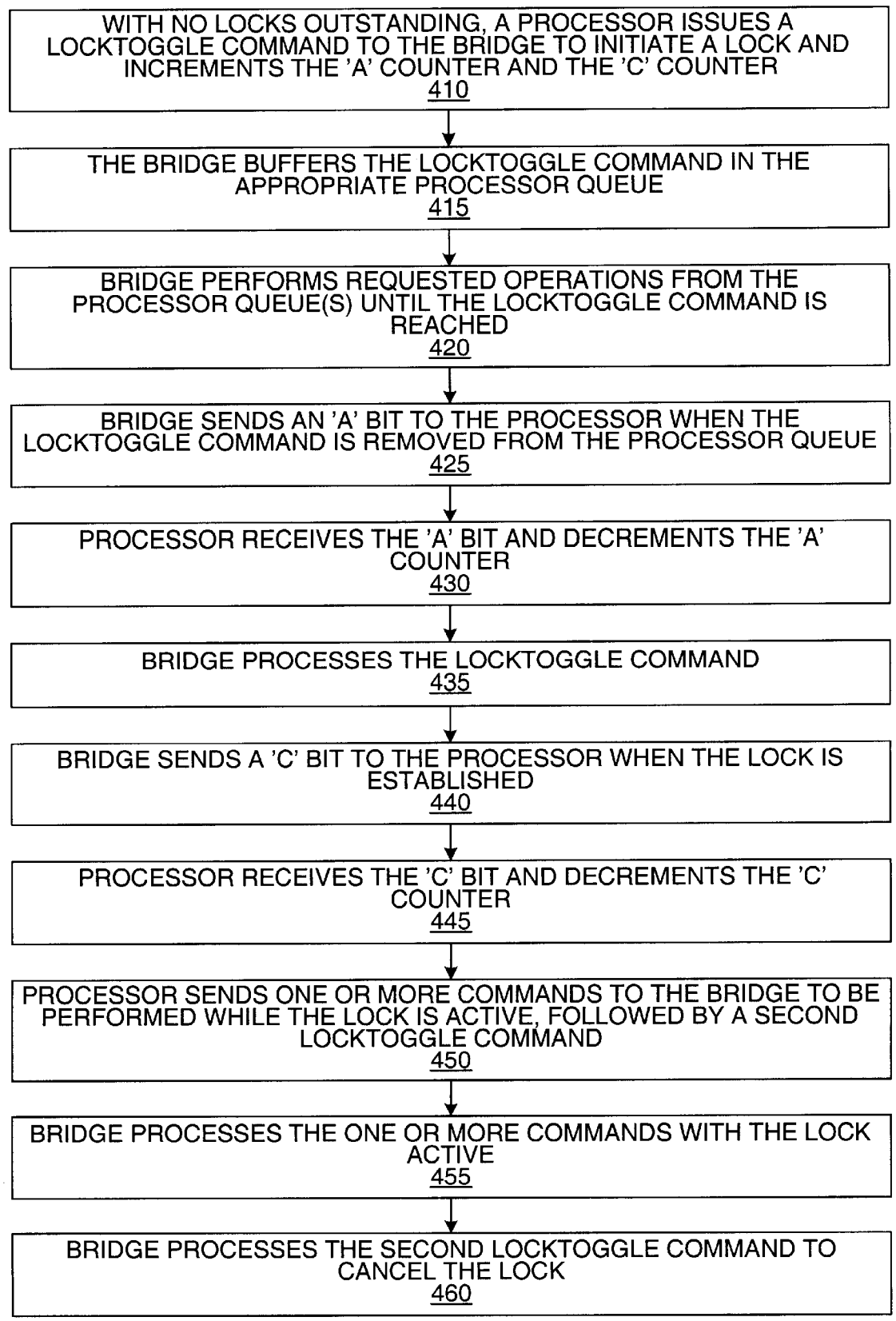
FIG. 3 is a flowchart of an embodiment of interactions between the processor and the bridge of FIG. 2.

Turning now to FIG. 3, one embodiment of a flowchart of overall operations for performing locked operations in a computer system, such as the computer system shown in FIGS. 1 and 2, is illustrated. While the operations shown in FIG. 3 are shown in flowchart form, it is noted that various operations of FIG. 3 may occur in differing order, or not at all.

With no locks outstanding, a first processor 110A of one or more processors 110 issues a locktoggle command to the bridge 130 to initiate a lock. The processor 110A also increments the resource counter 118 and the commit counter 119 (step 410), and generally refrains from initiating other commands, although some embodiments may choose to initiate speculative commands. The bridge 130 buffers the locktoggle command in the appropriate processor queue 134 (step 415). The bridge performs requested operations from the one or more processor queues 134 until the locktoggle command is reached (step 420). Similar to most other operations, the bridge 130 sends an acknowledge signal (e.g. an A-bit) to the appropriate processor 110A when the locktoggle command is removed from the processor queue 134A (step 425). The processor 110A receives the A-bit and decrements the resource counter 118 (step 430).

The bridge 130 processes the locktoggle command (step 435), e.g. as described in FIG. 5 below. The bridge 130 sends a commit signal (e.g. a C-bit) to the processor 110A when the lock is established (step 440). The processor 110A receives the C-bit, and decrements the commit counter 119 (step 445). Once the commit counter 119 reaches zero, the processor 110A is informed that the lock has been established. Subsequently, the processor 110A sends one or more commands to the bridge 130 to be performed while the lock is active, which are followed by a second locktoggle command (step 450). The bridge 130 processes the one or more commands with the lock active (step 455). The bridge 130 then processes the second locktoggle command to cancel the lock (step 460). The second locktoggle command is processed in a manner similar to the first locktoggle command.

Figure 4:
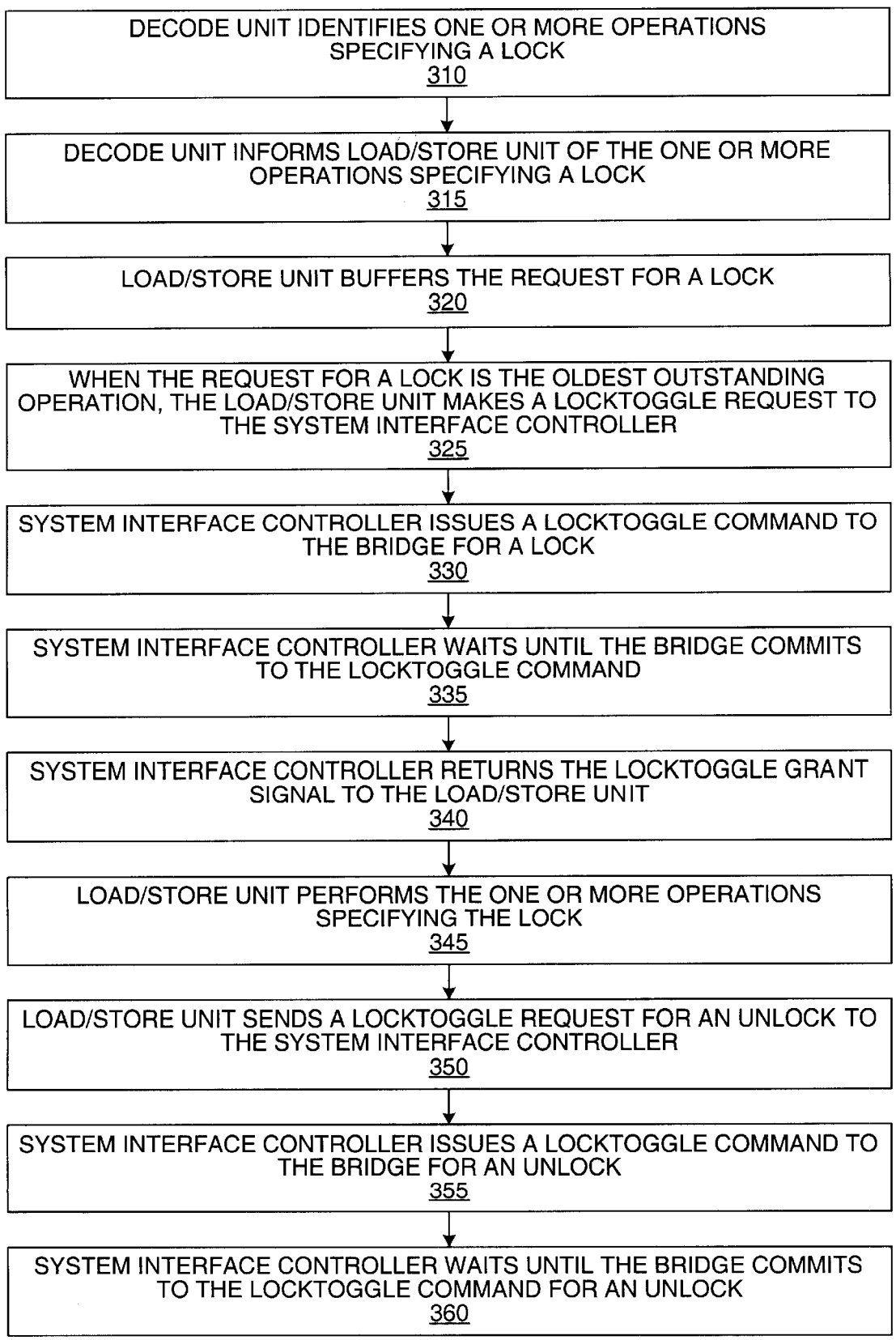
FIG. 4 is a flowchart of an embodiment of a method for performing locked operations in the computer system of FIG. 2.

Turning now to FIG. 4, one embodiment of the flowchart of the operations of a first processor 110A of the processors 110A and 110B of FIG. 2 interacting with a bridge 130 for performing locked operations are detailed. The operations shown in FIG. 4 are illustrative only and do not include additional features or operations of processor 110 or bridge 130 which are not a part of the illustrated operation flow. While the operations shown in FIG. 4 are shown in flowchart form, it is noted that various operations of FIG. 4 may occur in differing order, or not at all.

The decode unit 112 decodes and identifies one or more instructions specifying a lock (step 310). Next, the decode unit 112 informs the load/store unit 114 of the,one or more memory operations that specify a lock (step 315). More particularly, the decode unit 112 transmits the one or more memory operations to the load/store unit 114 and asserts the lock signal. The load/store unit 114 buffers the memory operations and the corresponding request for a lock (step 320). When the request for a lock is the oldest outstanding operation, the load/store unit 114 makes a locktoggle request to the system interface controller 116 (step 325).

The system interface controller 116 issues a first locktoggle command to the bridge 130 for a lock (step 330). The system interface controller 116 waits until the bridge 130 executes the first locktoggle command (step 335), e.g. until the commit counter 119 is decremented to zero. The system interface controller 116 returns the locktoggle grant signal to the load/store unit 114 (step 340), subsequent to the bridge 130 committing to the first locktoggle command.

The load/store unit 114 performs the one or more operations specifying the lock (step 345) in response to receiving the locktoggle grant signal from the system interface controller 116. The load/store unit 114 sends a second lock request in order to release the lock to the system interface controller 116 (step 350). The system interface controller 116 issues a second locktoggle command to the bridge 130 for an unlock (step 335). The system interface controller 116 may issue the second locktoggle command to the bridge 130 for an unlock in response to receiving the second locktoggle request (for unlock) from the load/store unit 114. The system interface controller 116 waits until the bridge 130 executes to the locktoggle command for an unlock (step 360), and then returns the locktoggle grant signal.

Figure 5:
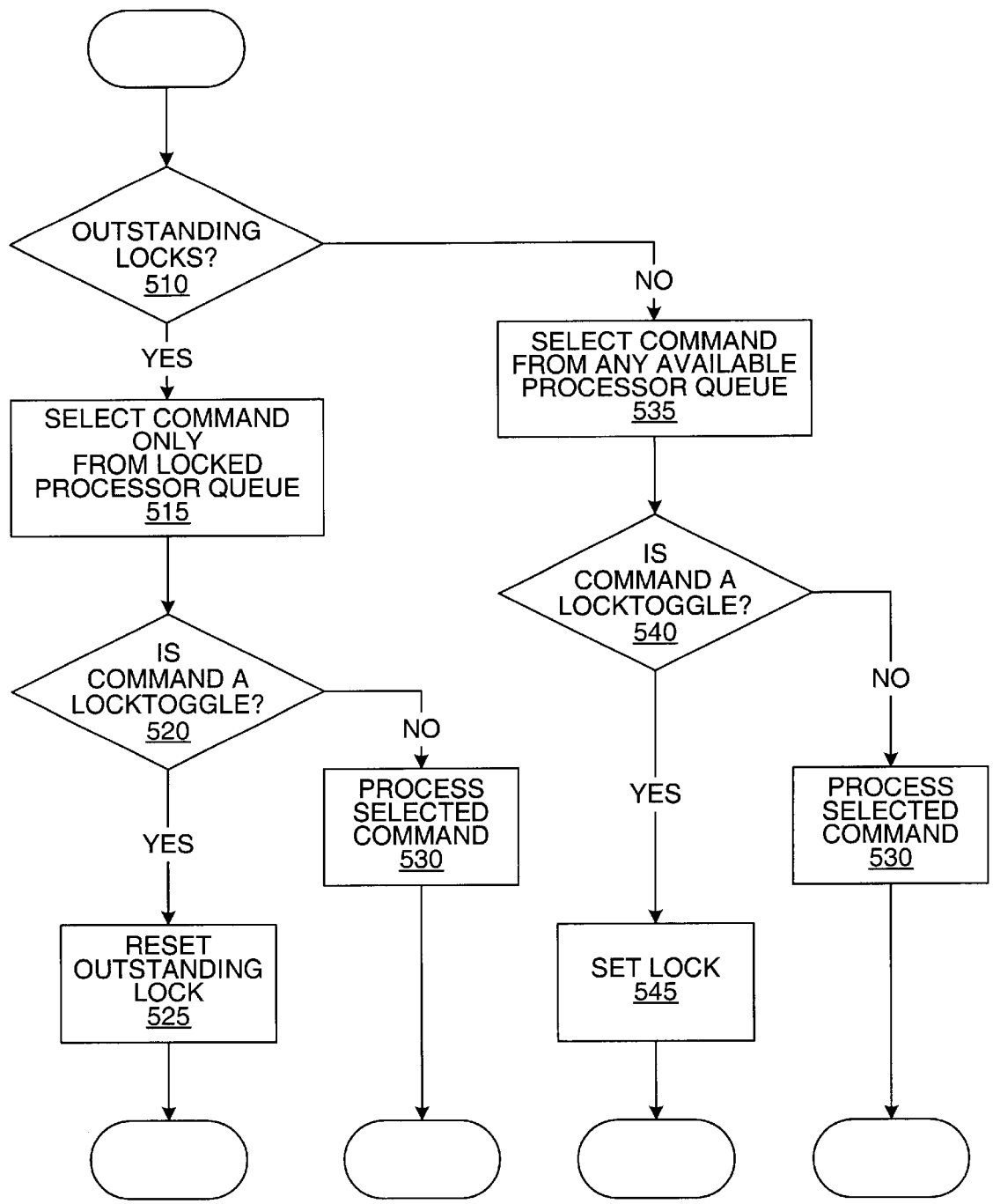
FIG. 5 is a flowchart of an embodiment of operations of the bridge of FIG. 1.

FIG. 5 illustrates an embodiment of a high level flowchart of the operations of the bridge 130 as control logic 136 removes commands from the various processor queues 134. While the operations shown in FIG. 5 are shown in flowchart form, it is noted that various operations of FIG. 5 may occur in differing order, or not at all.

Control logic 136 first checks to see if there are any outstanding locks (decision block 510). Outstanding locks may be indicated by a lock condition in the lock register 132 or by another means of signifying a lock condition as desired. More particularly, the lock condition in lock register 132 may indicate no lock, a lock for processor 110A, or a lock for processor 110B. Other encodings of the lock condition may identify locks for any number of professors 110, as desired. If there is an outstanding lock, then the control logic 136 selects commands only from the processor queue that issued the lock (step 515). The control logic 136 examines the command to see if it is a locktoggle command (decision block 520). If the command is a locktoggle command, then the control logic 136 resets the outstanding lock (step 525). The control logic 136 sets the lock condition to no lock if there is an existing lock and a locktoggle command is executed. The control logic 136 is now operable to continue normal operations of the bridge 130.

If the command is not a locktoggle command at decision block 520, then the bridge 130 processes. the selected command (step 530) with the lock continuing.

If there are no outstanding locks at decision block 510, then the control logic 136 selects an appropriate command from any available processor queue 134 (step 535). The protocol for determining which commands and from which queue 134 may be any suitable protocol, as desired. Control logic 136 checks to see if the command is a locktoggle command at decision block 540. If the command is a locktoggle command, the control logic sets a lock (step 545), such as setting the lock condition of lock register 132 to indicate a lock for the corresponding processor 110.

If the command at decision block 540 is not a locktoggle command, then the control logic 136 simply processes the selected command (step 530).

Turning now to FIG. 6, a block diagram of an embodiment of a format for processor-initiated commands, referred to herein as the SysAddOut command format, in the computer system of FIG. 1 is illustrated. In a preferred embodiment, the SysAddOut command format is used when a processor 110 issues commands to the system 130 for reads, writes, probe responses with no data movement, and cache-block state transition broadcasts, as well as the locktoggle command. The SysAddOut command format is preferably sent over lines [14:2]# of the address out lines of the processor address bus 128.

As shown, the SysAddOut command format includes four bit-times spread over two complete forwarded clock cycles in an embodiment clocked on both the rising and falling edges of the forwarded clock signal. Various bits of the physical address, designated ADDRESS in FIG. 6, are distributed over the four bit-time cycles. Other command fields include the M1 bit, the COMMAND[4:0] field, the M2 bit, the MASK[7:0] field, the CH field, the ID[2:0] field, and the RV bit.

As shown, bit-time 0 includes the M1 bit, the COMMAND[4:0] field, and a portion of the ADDRESS. The M1 bit is the early probe miss indicator. If M1 is set [1], the oldest probe received by this processor 110 resulted in a miss. M1 is asserted if a probe result in bit-time 0. The COMMAND[4:0] field is used to indicate the command encoding from the processor 110 to the system 130. The various encodings of the COMMAND[4:0] field identify reads, writes, probe responses, etc. One particular encoding indicates the locktoggle command.

As shown, bit-time 1 includes another. portion of the ADDRESS.

As shown, bit-time 2 includes the M2 bit, the MASK[7:0] field, the CH field, and the ID[2:0] field. The M2 bit is the late probe miss indicator or the cache hit validation. If M2 is set [1], the oldest probe received by this processor 110 resulted in a miss. M2 is asserted if a probe was determined after bit-time 0 and before bit-time 2. M2 may also. validate the CH bit that indicates a probe hit but no data movement. The MASK[7:0] field is the data transfer mask. The MASK [7:0] field is used for all sub-cache block commands (byte, LW, QW) and indicates which bytes (e.g. 8 bits), long words (e.g. 16 bits), or quadwords (e.g. 32 bits) of the data bus 128 are valid for the requested data transfer. The CH bit is the cache hit bit. The cache hit bit is set [e.g. 1] if the oldest oldstanding probe resulted in a processor cache hit with no data movement to the system 130 is required. The M2 bit is set when the cache hit bit is set. The ID[2:0] field is the buffer identification field. The ID[2:0] field specifies the miss address buffer (MAB), the victim data buffer (VDB), or the write data buffer (WDB) entry corresponding to the command in the COMMAND[4:0] field. The ID[2:0] field implicitly maps the WDB or VDB depending on the command.

As shown, bit time 3 includes the RV bit and another portion of the ADDRESS. The RV bit is the read valid bit that validates speculative commands in the COMMAND [4:0] field.

Turning now to FIG. 7, a block diagram of an embodiment of a format for system-initiated commands to maintain memory coherency and to move data, referred to herein as the SysAddIn command format, in the computer system of FIG. 1 is illustrated. In a preferred embodiment, the SysAddIn command format is used when the bridge 130 issues commands to a processor 110 to probe caches of the processors 110 or to initiate data movement to and from the processors 110. The SysAddIn command format is preferably sent over lines [14:2]# of the address in lines of the processor address bus 128.

As shown, the. SysAddIn command format includes four bit-times spread over two complete forwarded clock cycles in an embodiment clocked on both the rising and falling edges of the forwarded clock signal. The physical address, designated ADDRESS in FIG. 7, is distributed over the four bit-time cycles. Other command fields include the probe type PROBE[4:0] field, the system data command SYSDC [4:0] field, the release victim buffer RVB bit, the release probe buffer RPB bit, the acknowledge A-bit, the buffer identification number ID[3:0] field, and the commit C-bit.

The probe type PROBE[4:0] field indicates the condition by which the processor 110 should return data to the bridge 130 and if the probe results in a cache-block hit, the cache state to which the processor must change the cache block. The system data command SYSDC[4:0] field controls data movements to and from the processor. Various encodings of the probe type PROBE[4:0] field and the system data command SYSDC[4:0] field are contemplated. The RVB bit, when asserted, signals the processor 110 to release the VDB or WDB entry corresponding to the ID[3:0] field. The RPB bit, when asserted, signals the processor to release the probe data entries in the VDB corresponding to ID[2:0].

The acknowledge bit acknowledges a processor-issued command. The processor then decrements the resource counter. The buffer identification number field identifies the buffer ID associated with the RVB and the RPB bits for writes and buffer release commands. ID[3] is set to indicate a WDB entry, while ID[3] cleared indicates a VDB entry. The commit bit is asserted by the system 130 to indicate when a processor-generated command has reached the coherency point.

In a preferred embodiment, the processor bus, 126A and 128A, is compatible with a version of the EV6 bus from Digital Equipment Corp. of Maynard, Mass. The EV6 bus was designed for the ALPHA processor, also available from Digital Equipment Corp. The locktoggle command preferable uses the MB code point to request a lock or an unlock when the processor is a processor 110, since the memory barrier transaction is not performed by processors 110A and 110B. Thus, the locktoggle command allows processor 110 to use the EV6 bus and still maintain compatibility with the ALPHA processor.

Numerous variations and modifications will become apparent to those skilled in the art once the above disclosure is fully appreciated. It is intended that the following claims be interpreted to embrace all such variations and modifications.

What is claimed is:

1. A processor, comprising:
   a decode unit coupled to receive and decode a first one or more instructions that specify a lock, wherein said decode unit is configured to generate a lock indication in response to said first one or more instructions;
   a load/store unit coupled to receive said lock indication and said first one or more instructions from said decode unit, wherein said load/store unit is configured to select said first one or more instructions for execution and to transmit a first request for a locktoggle command in response thereto; and
   a system interface controller coupled between said load/store unit and a bus, wherein said system interface controller is configured to receive said first request for said locktoggle command from said load/store unit, and wherein said system interface controller is further configured to issue said first locktoggle command in response to receiving-said request for said first locktoggle command;
   wherein said load/store unit is further configured to transmit a second request for said locktoggle command in response to executing said first one or more instructions; and wherein said system interface controller is further configured to receive said second request for said locktoggle command from said load/store unit and to issue said second locktoggle command in response to receiving said second request for said locktoggle command.

2. The processor of claim 1, wherein said system interface controller further includes a plurality of buffers, including:
   a resource counter configured to track queue entries in use, and
   a commit counter is configured to track outstanding processor commands.

3. The processor of claim 2, wherein said system interface controller is further configured to increment said resource counter in response to issuing a processor command, and wherein said system interface controller is further configured to increment said commit counter in response to issuing said processor command.

4. The processor of claim 3, wherein said system interface controller is further configured to decrement said resource counter in response to receiving an acknowledge signal from a system device, and wherein said system interface controller is further configured to decrement said commit counter in response to receiving a commit signal from said system device.

5. The processor of claim 4, wherein said acknowledge signal is sent by said system device in response to freeing a queue entry.

6. The processor of claim 4, wherein said commit signal is sent by said system device in response to reaching a coherency point with respect to a particular processor command.

7. The processor of claim 6, wherein said load/store unit is further configured to buffer said first request for said locktoggle command until said first request for said locktoggle command is an oldest outstanding operation; and
wherein said system interface controller is further configured to notify said load/store unit when said locktoggle command has been executed.

8. A bridge for coupling one or more processors into a computer system, the bridge comprising:
a first input port coupled to receive a plurality of commands from a first one of said one or more precessors;
a first processor queue coupled to said first input port, wherein said first input port is configured to transfer said plurality of commands from said first one of said one or more processors to said first processor queue, wherein said first processor queue is configured to store said plurality of commands from said first one of said one or more processors, wherein said plurality of commands from said first one of the one or more processors includes a locktoggle command;
a lock register configured to store a lock condition; and
control logic coupled to said first input queue and said lock register, wherein said control logic is configured to remove said plurality of commands from said first one of said one or more processors from said first processor queue, wherein in response to removing said locktoggle command from said first processor queue, said control logic is configured to check said lock condition, wherein said control logic is further configured to set said lock condition to indicate a lock for said first one of said one or more processors if said lock condition indicates a lack of lock and to set said lock condition to indicate said lack of lock if said lock condition indicates said lock.

9. The bridge of claim 8, wherein said plurality of commands includes one or more commands that specify said lock, wherein said one or more commands that specify said lock are received in said first processor queue after said locktoggle command, wherein said control logic is further configured to execute said one or more commands that specify said lock while said lock condition indicates said lock.

10. The bridge of claim 9, wherein said plurality of commands includes a second locktoggle command, wherein said second locktoggle command is received at said first processor queue after said one or more commands that specify said lock, and wherein said control logic is further configured to set said lock condition to indicate said lack of lock after executing said one or more commands that specify said lock.

11. The bridge of claim 8, further comprising:
a second input port coupled to receive a second plurality of commands from a second one of one or more processors;
a second processor queue coupled to said second input port, wherein said second input port is configured to transfer said second plurality of commands from said second one of the one or more processors to said second processor queue, wherein said second processor queue is configured to store said second plurality of commands from said second one of the one or more processors;
wherein said control logic is further configured to select commands from said first processor queue and said second processor queue according to a predetermined protocol, wherein said control logic is further configured to only select commands from said first processor queue when said lock condition indicates said lock for said first one of said one or more processors.

12. The bridge of claim 11, wherein each of said one or more processors are coupled to said bridge by separate processor buses.

13. A computer system, comprising:
one or more processors; and
a bridge coupled to said one or more processors, wherein said bridge is configured to execute commands received from said one or more processors;
wherein each of said one or more processors is configured to transmit a locktoggle command to said bridge to request that a lock condition be set to indicate a lock, wherein said bridge is configured in response to receiving said locktoggle command from a first one of said one or more processors to check said lock condition, wherein said control logic is further configured to set said lock condition to indicate said lock for said first one of said one or more processors if said lock condition indicates a lack of lock and to set said lock condition to indicate said lack of lock if said lock condition indicates said lock.

14. The computer system of claim 13, wherein said bridge is further configured to execute only commands received from said first one of said one or more processors while said lock condition indicates said lock for said first one of said one or more processors.

15. The computer system of claim 13, wherein said bridge includes a lock register configured to store said lock condition.

16. The computer system of claim 13, wherein each of said one or more processors includes:
a decode unit coupled to receive and decode a first one or more instructions that specify said lock, wherein said decode unit is configured to generate a lock indication in response to said first one or more instructions;
a load/store unit coupled to receive said lock indication and said first one or more instructions from said decode unit, wherein said load/store unit is configured to select said first one or more instructions for execution and to transmit a first request for said locktoggle command in response thereto; and
a system interface controller coupled between said load/store unit and a bus, wherein said system interface controller is configured to receive said first request for said locktoggle command from said load/store unit, and wherein said system interface controller is further configured to issue said first locktoggle command in response to receiving said request for said first locktoggle command;

wherein said load/store unit is further configured to transmit a second request for said locktoggle command in response to executing said first one or more instructions; and wherein said system interface controller is further configured to receive said second request for said locktoggle command from said load/store unit and to issue said second locktoggle command in response to receiving said second request for said locktoggle command.

17. The computer system of claim 16, wherein said system interface controller further includes a plurality of buffers, including:
  a resource counter configured to track queue entries in use; and
  a commit counter is configured to track outstanding processor commands;
  wherein said system interface controller is further configured to increment said resource counter in response to issuing a processor command, and wherein said system interface controller is further configured to increment said commit counter in response to issuing said processor command.

18. The computer system of claim 17, wherein said bridge is further configured to send an acknowledge signal in response to freeing a queue entry, and wherein said bridge is further configured to send a commit signal in response to reaching a coherency point with respect to a particular processor command.

19. The computer system of claim 18, wherein said system interface controller is further configured to decrement said resource counter in response to receiving said acknowledge signal from said bridge, and wherein said system interface controller is further configured to decrement said commit counter in response to receiving said commit signal from said bridge.

20. The computer system of claim 19, wherein said load/store unit is further configured to buffer said first request for said locktoggle command until said first request for said locktoggle command is an oldest outstanding operation; and
  wherein said system interface controller is further configured to notify said load/store unit when said first locktoggle command has been executed.

21. A method for operating a computer system including one or more processors and a system device, the method comprising:
  issuing a first locktoggle command from a first processor of said one or more processors to said system device;
  checking an indication of a lock condition in said system device in response to said first locktoggle command;
  setting said lock condition to indicate a lock by said first processor in response to checking said indication of said lock condition and determining that said lock condition indicates a lack of lock; and
  setting said lock condition to indicate said lack of lock in response to checking said indication of said lock condition and determining that said lock condition indicates said lock.

22. The method of claim 21, further comprising:
  ignoring commands from a second processor of said one or more processors while said lock condition indicates said lock for said first processor.

23. The method of claim 21, further comprising:
  sending said one or more commands specifying said lock from said first processor to said system device in response to setting said lock condition to indicate said lock; and
  sending a second locktoggle command from said first processor to said system device subsequent to sending said one or more commands specifying said lock from said first processor to said system device.

24. A computer system, comprising:
  one or more processors; and
  a bridge coupled to said one or more processors;
  wherein a first one of said one or more processors is configured to transmit a first command to said bridge to toggle a lock condition in said bridge, wherein said bridge is configured, in response to receiving said first command from said first one of said one or more processors, to set said lock condition to indicate a lock for said first one of said one or more processors if said lock condition indicates a lack of lock and to set said lock condition to indicate said lack of lock if said lock condition indicates said lock for said first one of said one or more processors.

25. The computer system of claim 24, wherein said bridge is further configured to execute only commands received from said first one of said one or more processors while said lock condition indicates said lock for said first one of said one or more processors.

26. The computer system of claim 24, wherein said bridge includes a lock register configured to store said lock condition.

27. The computer system of claim 24, wherein said bridge is configured to set said lock condition to indicate a lock for a second one of said one or more processors if said lock condition indicates said lack of lock responsive to receiving said first command from said second one of said one or more processors.

28. A bus bridge comprising:
  a lock storage device configured to store a lock condition; and
  a control logic coupled to said lock storage device and coupled to receive a first command from a first processor to toggle said lock condition, wherein said control logic is configured to set said lock condition in said lock register to indicate a lock by said first processor in response to said first command and determining that said lock condition indicates a lack of lock, and wherein said control logic is configured to set said lock condition to indicate said lack of lock in response to said first command and determining that said lock condition indicates said lock by said first processor.

29. The bus bridge of claim 28 wherein said control logic is further configured to execute only commands received from said first processor while said lock condition indicates said lock for said first processor.

30. The bus bridge of claim 28, wherein said lock storage device is a lock register.

31. The bus bridge of claim 28, wherein said control logic is configured to set said lock condition to indicate a lock for a second processor different from the first processor if said lock condition indicates said lack of lock responsive to receiving said first command from said second processor.

32. A processor comprising:
  a first circuit configured to generate a first request in response to either a request for lock or a request for lock release; and
  a system interface controller coupled to said first circuit, wherein said system interface controller is configured to transmit a first command to toggle a lock condition in response to said first request.

33. The processor as recited in claim 32, wherein the first circuit is configured to execute one or more memory accesses subsequent to said first command, the one or more memory accesses performed in a locked state.

34. The processor as recited in claim 33 wherein the system interface controller is configured to indicate to the first circuit that the first command is committed, and wherein the first circuit is configured to execute said one or more memory accesses responsive to the indication from the system controller.

35. The processor as recited in claim 32 wherein the first circuit is configured to perform a locked sequence by generating said first request, performing one or more memory accesses subsequent to said first command, and generating said first request again subsequent to said one or more memory accesses.

36. The processor as recited in claim 32 wherein the first circuit is configured to generate said first request responsive to said request for lock or said request for lock release being an oldest outstanding request in said first circuit.

* * * * *